United States Patent
Mack et al.

(10) Patent No.: US 9,784,281 B2
(45) Date of Patent: Oct. 10, 2017

(54) EXHAUST-GAS TURBOCHARGER

(71) Applicant: BorgWarner Inc., Auburn Hills, MI (US)

(72) Inventors: Sebastian Mack, Bubenheim (DE); Johannes Hornbach, Frankenthal (DE); Sven Liebl, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 275 days.

(21) Appl. No.: 14/402,124

(22) PCT Filed: May 16, 2013

(86) PCT No.: PCT/US2013/041271
§ 371 (c)(1),
(2) Date: Nov. 19, 2014

(87) PCT Pub. No.: WO2013/180959
PCT Pub. Date: Dec. 5, 2013

(65) Prior Publication Data
US 2015/0110600 A1    Apr. 23, 2015

(30) Foreign Application Priority Data
May 29, 2012    (DE) .................. 10 2012 010 550

(51) Int. Cl.
*F04D 29/08* (2006.01)
*F02B 37/00* (2006.01)
(Continued)

(52) U.S. Cl.
CPC .......... *F04D 29/083* (2013.01); *F01D 11/003* (2013.01); *F02B 37/00* (2013.01);
(Continued)

(58) Field of Classification Search
CPC ...... F01D 11/003; F01D 11/005; F02B 37/00; F02C 6/12; Y10T 29/49236; F04D 17/10;
(Continued)

(56) References Cited

U.S. PATENT DOCUMENTS 7,004,452 B2 * 2/2006 Chatufale ............. F16K 3/0227
251/171
7,797,936 B2 * 9/2010 Hayashi .................. F01D 25/16
411/395

(Continued)

FOREIGN PATENT DOCUMENTS

DE    WO 2012102854 A2 *    8/2012    .......... F16K 1/2064
JP          11229886 A        8/1999

OTHER PUBLICATIONS

Machine Translation of JP11-229886A [retrieved on Oct. 19, 2016]. Retrieved from: Japan Platform for Patent Information.*
(Continued)

*Primary Examiner* — Woody Lee, Jr.
*Assistant Examiner* — Eric Zamora Alvarez
(74) *Attorney, Agent, or Firm* — Eric L. Doyle; Stephan A. Pendorf; Patent Central LLC

(57) ABSTRACT

An exhaust-gas turbocharger (1) with a bearing housing (2), a shaft (3) mounted in the bearing housing (2), a compressor wheel (5) arranged on the shaft (3) and a turbine wheel (4) arranged on the shaft (3), a housing component (7) which surrounds the compressor wheel (5) or the turbine wheel (4), and a sealing ring (14) between the bearing housing (2) and the housing component (7), wherein the sealing ring (14) is, in order to impart its sealing action, compressed in a direction perpendicular to the shaft (3).

9 Claims, 4 Drawing Sheets

(51) Int. Cl.
 F04D 29/40 (2006.01)
 F04D 17/10 (2006.01)
 F01D 11/00 (2006.01)
 F02C 6/12 (2006.01)

(52) U.S. Cl.
 CPC ............... *F02C 6/12* (2013.01); *F04D 17/10* (2013.01); *F04D 29/403* (2013.01); *Y10T 29/49236* (2015.01)

(58) Field of Classification Search
 CPC .. F04D 29/083; F04D 29/403; F05D 2240/40; F05D 2250/75; F16J 15/06; F16J 15/062; F16J 15/0893
 USPC ......... 277/567, 626, 644, 645, 647; 415/111
 See application file for complete search history.

(56) References Cited

U.S. PATENT DOCUMENTS

| | | | |
|---|---|---|---|
| 8,545,172 B2 * | 10/2013 | Severin | F01D 25/145 415/164 |
| 2004/0109761 A1 | 6/2004 | Scherrer | |
| 2005/0053462 A1 * | 3/2005 | Burdgick | F01D 11/005 415/189 |
| 2006/0188368 A1 | 8/2006 | Jinnai et al. | |
| 2009/0151348 A1 | 6/2009 | Hayashi et al. | |
| 2011/0142604 A1 | 6/2011 | Schumnig et al. | |
| 2012/0328416 A1 * | 12/2012 | Igarashi | F01D 17/105 415/159 |

OTHER PUBLICATIONS

International Search Report in International Application No. PCT/US2013/041271 dated Aug. 23, 2013.

* cited by examiner

EXHAUST-GAS TURBOCHARGER

The invention relates to an exhaust-gas turbocharger according to the preamble of claim 1 and to a method for the assembly of an exhaust-gas turbocharger.

Figure 4:
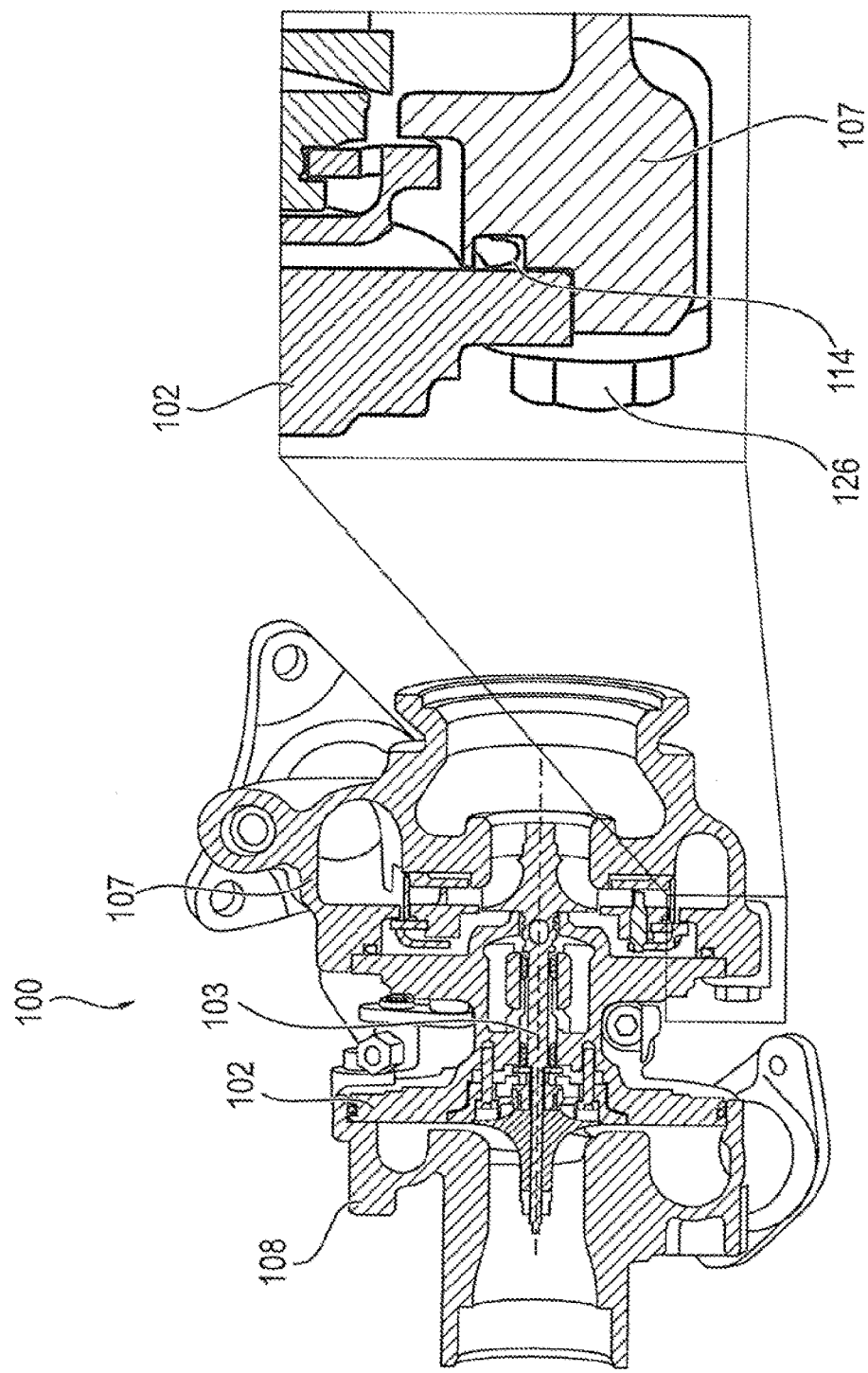

FIG. 4 shows an exhaust-gas turbocharger 100 according to the prior art. A section through the entire exhaust-gas turbocharger 100 is illustrated on the left-hand side. The right-hand illustration shows a detail. The housing of the already-known exhaust-gas turbocharger 100 is composed of a bearing housing 102 in which a shaft 103 is mounted. On one side, the bearing housing 102 is closed off by a compressor housing 108. On the other side of the bearing housing 102, there is situated a turbine housing 107. The detail illustration shows the connection between the bearing housing 102 and the turbine housing 107. The turbine housing 107 is normally fixedly connected to the bearing housing 102 by means of a screw connection 126. A sealing ring 114 is situated between the two housing components. The sealing ring is of V-shaped form. The V-shaped form opens in a direction perpendicular to the shaft 103. In already-known turbochargers 100, an axially sealing shaped sealing ring (for example the sealing ring 114) or alternatively a half-bead seal is used for sealing the connecting point between the turbine housing 107 and the bearing housing 103. Since both variants are constructed axially, screw forces of the screw connection 126 are also required to compress the seal. The action of the seals is based on their linear pressure, which is highly dependent on the number, size and tightening torque of the screw connections 126. Owing to packaging requirements and the provision of tool access for the screwdrivers during assembly, a compromise is usually reached between assemblability and sealing action.

It is therefore an object of the present invention to specify an exhaust-gas turbocharger as per the preamble of claim 1, the housing components of which are sealed off with respect to one another in as effective a manner as possible, wherein the exhaust-gas turbocharger should be inexpensive to produce and assemble. It is also an object to specify a corresponding method for assembling the exhaust-gas turbocharger.

This object is achieved in each case by the features of the independent claims. The dependent claims relate to preferred refinements of the invention.

According to the invention, the sealing ring is no longer compressed axially. It is in fact provided according to the invention that the sealing ring, in order to impart sealing action, is compressed in a direction perpendicular to the shaft, that is to say in a radial direction. According to the invention, said arrangement is used for a sealing ring between the bearing housing and a housing component. The housing component may be either the turbine housing or the compressor housing. It is crucial that the sealing ring is formed and arranged such that the corresponding deformation for producing the sealing action at the sealing ring has already been generated before the axial screw connection is established.

As a result of the radial arrangement, or radial compression of the sealing ring, according to the invention, influence is no longer exerted on the screw forces of the screw connection for connecting the bearing housing to the housing component. The screw forces can thus be used entirely for the bracing of the bearing housing to the housing component. Since the sealing ring, to impart its sealing action, no longer requires screw forces which were required in the prior art in order to generate an adequately high linear pressure on the sealing ring, it is possible for some screws to be omitted and/or to be arranged such that the screws are distributed non-uniformly, in order to ensure easier accessibility during the assembly process. The assembly time is also reduced in this way. Since the sealing ring according to the invention is pushed on, centered at the inside or at the outside, before the bearing housing and the housing component are fitted together, captive installation is automatically also ensured such that assembly and process capability are optimized.

As a result of the use of the sealing ring according to the invention, there is no longer a compromise between sealing action and assemblability, and any requirement can be individually designed for in an optimum manner.

It is expedient for the sealing ring to be arranged between the bearing housing and the turbine housing, and thus prevent an escape of exhaust gas. It is however also provided for the sealing ring to be used between the bearing housing and compressor housing.

In the method according to the invention, it is important that the sealing ring is deformed in a radial direction by the pushing-together of bearing housing and housing component. Only thereafter is the screw connection of the housing established.

Figure 1:
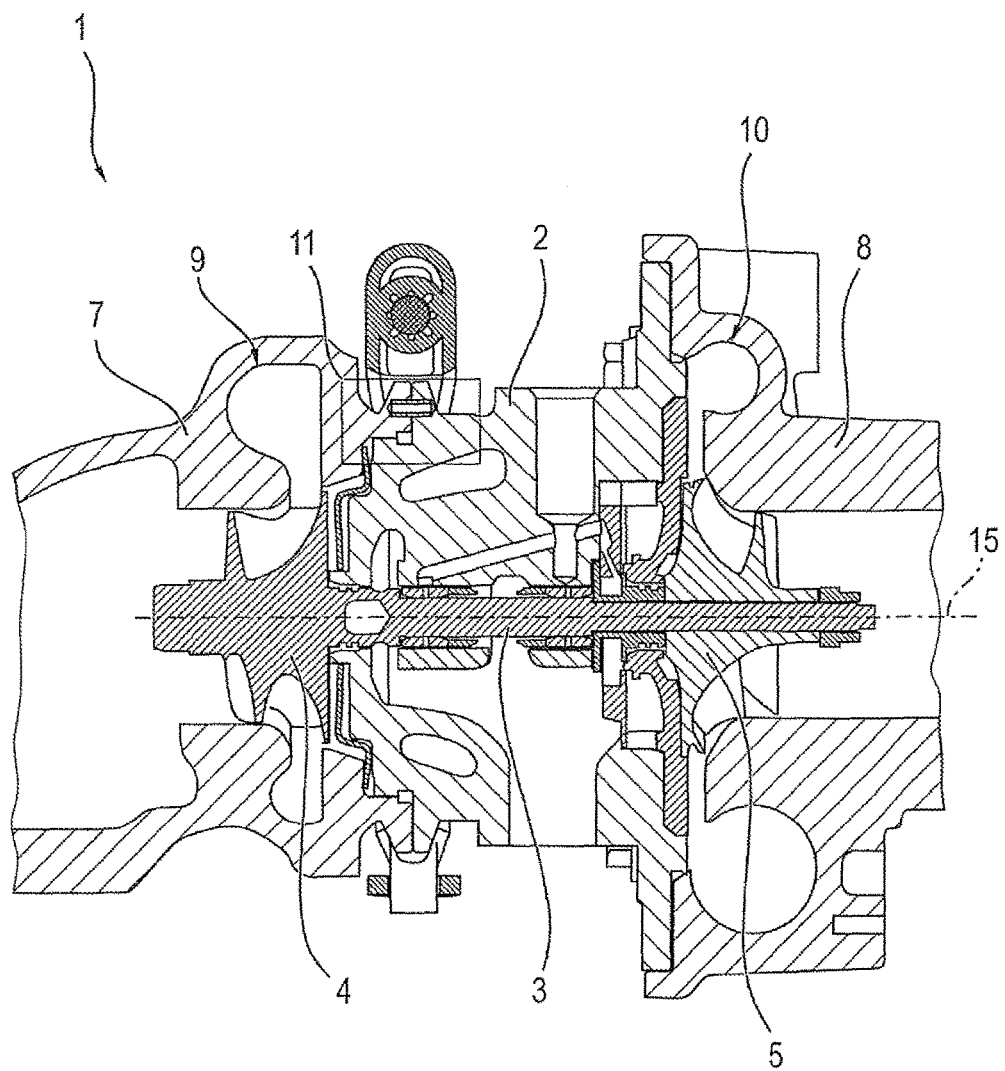
Figure 2:
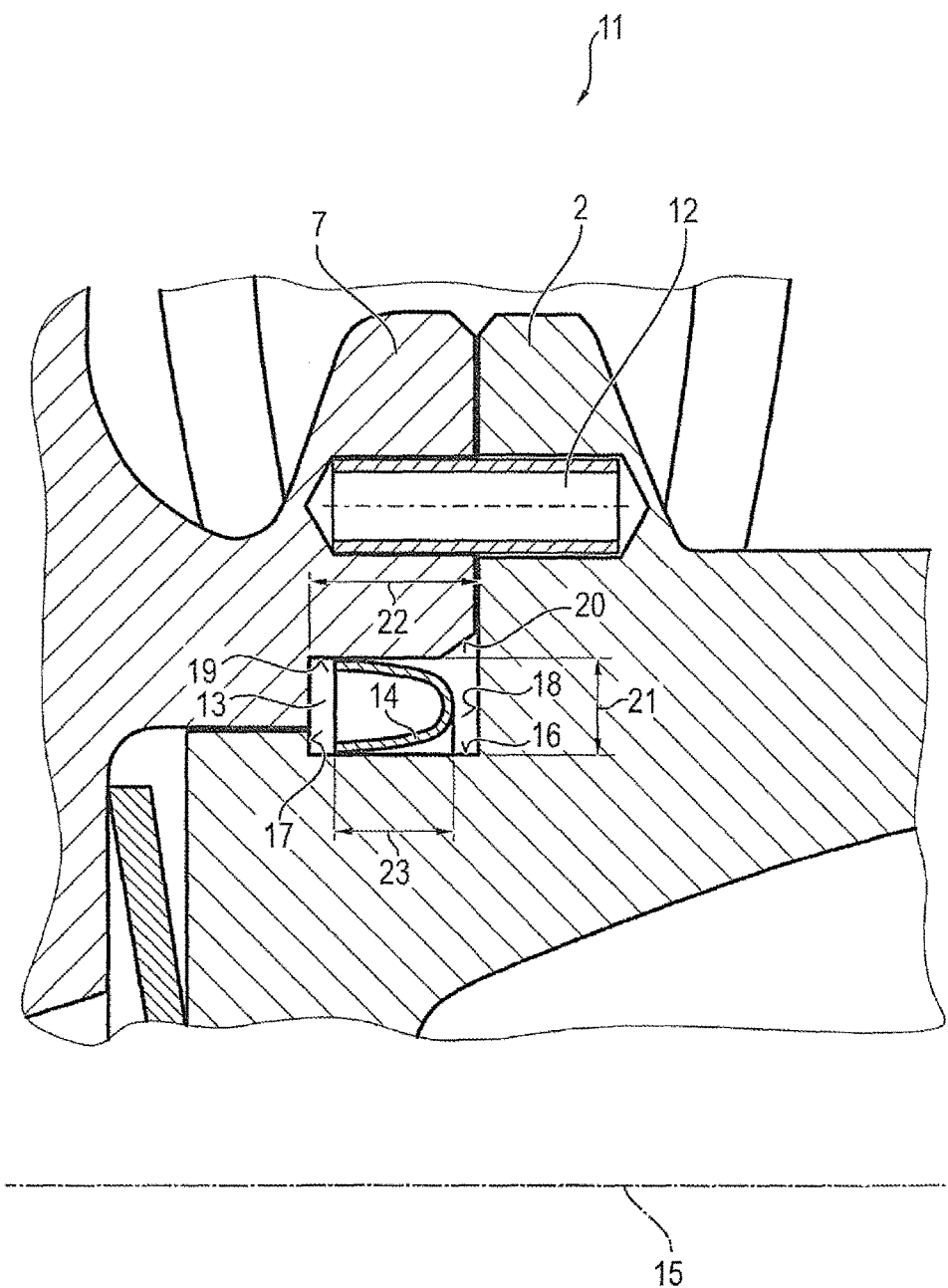
Figure 3:
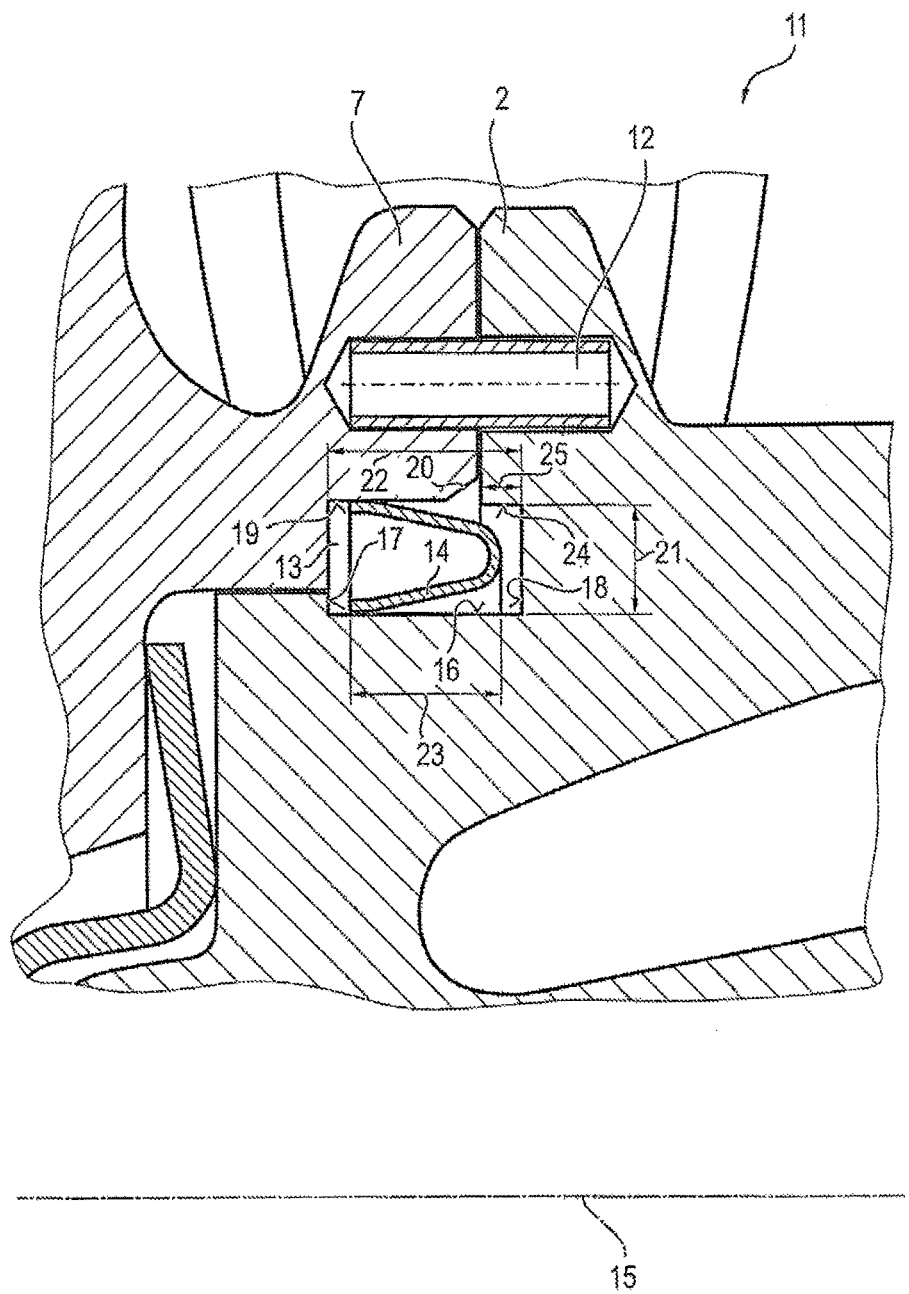

Further details, advantages and features of the present invention become apparent from the following description of exemplary embodiments with reference to the drawing, in which:

FIG. 1 shows a sectional view of an exhaust-gas turbocharger according to the invention as per a first exemplary embodiment, FIG. 2 shows a detail view of the exhaust-gas turbocharger according to the invention as per the first exemplary embodiment, FIG. 3 shows a detail view of the exhaust-gas turbocharger according to the invention as per a second exemplary embodiment, and FIG. 4 shows an exhaust-gas turbocharger according to the prior art.

A first exemplary embodiment of an exhaust-gas turbocharger 1 will be described below on the basis of FIGS. 1 and 2. FIG. 3 shows a detail of the exhaust-gas turbocharger 1 according to a second exemplary embodiment.

As FIG. 1 shows, the housing of the exhaust-gas turbocharger 1 is assembled from three main components. A bearing housing 2 is situated in the middle. A shaft 3 is rotatably mounted in said bearing housing 2. A turbine housing 7 and a compressor housing 8 are flange-mounted on the bearing housing 2. Seated on the shaft 3 on one side is a turbine wheel 4. A compressor wheel 5 is seated on the other side. An inflow duct 9 for exhaust gas is formed in the turbine housing 7. A discharge duct 10 for compressed air is formed in the compressor housing 8.

Exhaust gas that flows in via the inflow duct 9 drives the turbine wheel 4. Connected via the shaft 3, the compressor wheel 5 also rotates with the turbine wheel 4. The compressor wheel 5 sucks in air and discharges the compressed air via the discharge duct 10.

The turbine housing 7 and the compressor housing 8 are also referred to generally as "housing component". Below, reference is made in particular to the seal between the housing component and the bearing housing 2. Here, the exemplary embodiments show the seal between the turbine housing 7 and the bearing housing 2, because it is at this location in particular that the seal is used advantageously.

Reference sign 11 in FIG. 1 indicates the detail illustrated in FIGS. 2 and 3.

FIG. 2 shows the flange between the bearing housing 2 and turbine housing 7. For precise assembly, a centering pin 12 is provided which extends both into the bearing housing 2 and also into the turbine housing 7. A screw connection (not illustrated) between the turbine housing 7 and the bearing housing 2 runs parallel to said centering pin 12.

In each case one groove is formed in the bearing housing 2 and in the turbine housing 7. Said two grooves are arranged such that, in the assembled state, they form a cavity 13. Said cavity 13 is formed around the full circumference of the shaft 3. In the cavity 13 there is seated a sealing ring 14, formed as a V-shaped shaped sealing ring.

For simplicity of the illustration, FIG. 2 shows not the entire shaft 3 but rather only the longitudinal axis 15 of the shaft 3. The V-shape of the sealing ring 14 opens in a direction parallel to the shaft 3 or to the longitudinal axis 15 of the shaft 3.

The sealing ring 14 is squeezed or compressed between a first annular surface 16 and a second annular surface 19. The two annular surfaces 16, 19 are parallel to the shaft 3. The first annular surface 16 is formed on the bearing housing 2. The second annular surface 19 is formed on the turbine housing 7. The sealing ring 14 is deformed between the two annular surfaces 16, 19, and thus imparts its sealing action, independently of a bracing action generated for example by a screw connection in a longitudinal direction of the shaft 3. This can therefore also be referred to as a radial arrangement of the sealing ring 14.

The groove for receiving the sealing ring 14 in the bearing housing 2 is formed by the first annular surface 16. The first annular surface 16 is delimited on one side by a first wall 17 which is formed as a small shoulder. On the other side, the first annular surface 16 is delimited by a second wall 18. As a result of this configuration, the sealing ring 14 can be pushed onto or pre-mounted on the bearing housing 2 before the bearing housing 2 and turbine housing 7 are joined together. The sealing ring 14 is prevented from falling off by the first wall 17.

A bevel 20 is formed on the second annular surface 19. Said bevel 20 prevents damage to the sealing ring 14 when the bearing housing 2 and turbine housing 7 are pushed together.

A cavity height 21 is indicated in FIG. 2. The cavity height 21 is perpendicular to the shaft 3. Also shown is a cavity width 22 and a sealing ring width 23. The cavity width 22 and the sealing ring width 23 are parallel to the shaft 3. The cavity width 22 is greater than the sealing ring width 23. There is thus no deformation of the sealing ring 14 as a result of compression in an axial direction of the shaft 3. In the unmounted state, that is to say before the bearing housing 2 and the turbine housing 7 have been pushed together, a height of the sealing ring 14 is greater than the illustrated cavity height 21. The sealing ring 14 is compressed to the cavity height 21, and thus imparts its sealing action, only as a result of the pushing-together of the bearing housing 2 and turbine housing 7.

FIG. 3 shows the second exemplary embodiment in detail. Identical or functionally identical components are denoted by the same reference numerals in all of the exemplary embodiments. By contrast to the first exemplary embodiment, the groove in the bearing housing 2 has a wall 24 situated opposite the first annular surface 16. The width 25 of the opposite wall 24, measured parallel to the shaft 3, is significantly smaller than the overall cavity width 22. Said design according to the second exemplary embodiment increases the size of the cavity 13 and thus permits the insertion of a relatively large sealing ring 14.

In the method according to the invention for the assembly of the exhaust-gas turbocharger 1 according to the first or second exemplary embodiment, it is crucial that the sealing ring 14 is compressed as the bearing housing 2 and turbine housing 7 are pressed together. Here, the force exerted on the sealing ring 14 is in a direction perpendicular to the shaft 3. Only after the sealing ring 14 has been completely deformed is a conventional screw connection, such as is illustrated for example at reference sign 126 in FIG. 4, established. According to the invention, however, said screw connection has no effect whatsoever on the sealing ring 14, and also does not alter the sealing action of the sealing ring 14.

In addition to the above written description of the invention, reference is hereby explicitly made to the diagrammatic illustration of the invention in FIGS. 1 to 3 for additional disclosure thereof.

LIST OF REFERENCE SIGNS

1 Exhaust-gas turbocharger
2 Bearing housing
3 Shaft
4 Turbine wheel
5 Compressor wheel
7 Turbine housing
8 Compressor housing
9 Inflow duct
10 Discharge duct
11 Detail
12 Centering pin
13 Cavity
14 Sealing ring
15 Shaft axis
16 First annular surface
17 First wall
18 Second wall
19 Second annular surface
20 Bevel
21 Cavity height
22 Cavity width
23 Sealing ring width
24 Opposite wall
25 Wall width of the opposite wall

The invention claimed is:

1. An exhaust-gas turbocharger (1) comprising
a bearing housing (2),
a shaft (3) mounted in the bearing housing (2),
a compressor wheel (5) arranged on the shaft (3) and a turbine wheel (4) arranged on the shaft (3),
a housing component (7) which surrounds the compressor wheel (5) or the turbine wheel (4), and
a sealing ring (14) directly between the bearing housing (2) and the housing component (7),
wherein the sealing ring (14) is, in order to impart its sealing action, compressed in a direction perpendicular to the shaft (3), and wherein the sealing ring (14) is of V-shaped or U-shaped cross section, wherein the V-shape or U-shape opens in a direction parallel to the shaft (3).

2. The exhaust-gas turbocharger as claimed in claim 1, wherein the shaft has a circumference, and wherein the sealing ring (14) is arranged around the full circumference of the shaft (3).

3. The exhaust-gas turbocharger as claimed in claim 1, wherein a cavity (13) is formed by the bearing housing (2) and the housing component (7), for receiving the sealing ring (14), having a cavity height (21) perpendicular to the shaft (3) and having a cavity width (22) parallel to the shaft (3), wherein the sealing ring (14) has a sealing ring height perpendicular to the shaft (3) and a sealing ring width (23) parallel to the shaft (3), and wherein, in the fully assembled state of the exhaust-gas turbocharger (1), the cavity width (22) is greater than the sealing ring width (23).

4. The exhaust-gas turbocharger as claimed in claim 3, wherein the cavity height (21) is smaller than the sealing ring height of an unmounted sealing ring (14).

5. The exhaust-gas turbocharger as claimed in claim 1, wherein the sealing ring (14) is compressed between a first annular surface (16) of the bearing housing (2) and a second annular surface (19) of the housing component (7), wherein the first and second annular surfaces (16, 19) are arranged parallel to the shaft (3).

6. The exhaust-gas turbocharger as claimed in claim 5, wherein the first annular surface (16) or the second annular surface (19) is delimited at both sides by in each case one projecting wall (17, 18), and the sealing ring (14) can be pre-mounted between the two projecting walls (17, 18).

7. The exhaust-gas turbocharger as claimed in claim 1, further comprising screws between the bearing housing (2) and the housing component (7).

8. The exhaust-gas turbocharger as claimed in claim 1, wherein the housing component (7) is in the form of a turbine housing with an integrated inflow duct (9) for exhaust gas.

9. A method for assembly of an exhaust-gas turbocharger (1), the method comprising:
   providing a bearing housing (2), wherein the bearing housing (2) is designed for mounting a shaft (3) which connects a turbine wheel (4) to a compressor wheel (5),
   providing a housing component (7) which surrounds the compressor wheel (5) or the turbine wheel (4),
   inserting a sealing ring (14) into a groove, which is open in a direction perpendicular to the shaft (3), in the bearing housing (2) or in the housing component (7),
   pushing the bearing housing (2) and housing component (7) together in a direction parallel to the shaft (3) and simultaneously compressing the sealing ring (14), such that the sealing ring (14) is directly between the bearing housing (2) and the housing component (7), and
   screwing the bearing housing (2) and housing component (7) together after the sealing ring (14) has been compressed,
   wherein the sealing ring (14) is, in order to impart its sealing action, compressed in a direction perpendicular to the shaft (3), and wherein the sealing ring (14) is of V-shaped or U-shaped cross section, wherein the V-shape or U-shape opens in a direction parallel to the shaft (3).

* * * * *